United States Patent
Radbrant et al.

(10) Patent No.: US 8,014,178 B2
(45) Date of Patent: Sep. 6, 2011

(54) CONVERTER STATION

(75) Inventors: Ulf Radbrant, Ludvika (SE); Lars-Erik Juhlin, Ludvika (SE)

(73) Assignee: ABB Technology Ltd., Zürich (CH)

( * ) Notice: Subject to any disclaimer, the term of this patent is extended or adjusted under 35 U.S.C. 154(b) by 19 days.

(21) Appl. No.: 12/161,390

(22) PCT Filed: Jun. 15, 2006

(86) PCT No.: PCT/SE2006/000711
§ 371 (c)(1),
(2), (4) Date: Nov. 19, 2008

(87) PCT Pub. No.: WO2007/084034
PCT Pub. Date: Jul. 26, 2007

(65) Prior Publication Data
US 2009/0168468 A1    Jul. 2, 2009

Related U.S. Application Data

(60) Provisional application No. 60/759,570, filed on Jan. 18, 2006.

(51) Int. Cl.
*H02J 3/38* (2006.01)
*H02J 3/44* (2006.01)

(52) U.S. Cl. ............... 363/35; 363/51; 363/65; 307/71; 307/86

(58) Field of Classification Search ............ 363/34, 363/35, 37, 65, 50, 51; 307/71, 82, 86, 87; 361/18, 23, 93.1
See application file for complete search history.

(56) References Cited

U.S. PATENT DOCUMENTS

| | | | | |
|---|---|---|---|---|
| 3,952,210 | A | | 4/1976 | Kanngiesser |
| 4,419,591 | A | * | 12/1983 | Irokawa et al. ............... 307/45 |
| 4,459,492 | A | * | 7/1984 | Rogowsky .................. 307/82 |
| 6,141,226 | A | * | 10/2000 | Halvarsson et al. .......... 363/35 |

FOREIGN PATENT DOCUMENTS

| | | |
|---|---|---|
| EP | 0 645 867 A1 | 3/1995 |
| EP | 0 736 949 A1 | 10/1996 |
| GB | 1151854 | 5/1969 |

OTHER PUBLICATIONS

International Search Report, dated Oct. 17, 2006, issued in Counterpart Application No. PCT/SE2006/000711.
Written Opinion of the International Searching Autority, dated Oct. 17, 2006, issued in Counterpart Application No. PCT/SE2006/000711.

* cited by examiner

*Primary Examiner* — Gary L Laxton
*Assistant Examiner* — Nusrat J Quddus
(74) *Attorney, Agent, or Firm* — Venable LLP; Eric J. Franklin

(57) ABSTRACT

A converter station for connecting an AC system to a bipolar HVDC transmission line. A DC neutral arrangement is provided with first DC breakers enabling breaking of a first current path from a neutral bus of one pole of the transmission line to a neutral bus of another pole at bipolar operation of the station for isolation of a faulty section and changing to monopolar operation/metallic return thereof. The DC neutral arrangement has in the first current path at least two first DC breakers connected in series and adapted to act as a backup for each other would the other thereof fail to break the first current path upon a control to isolate a faulty section by changing from bipolar to monopolar operation.

11 Claims, 4 Drawing Sheets

CONVERTER STATION

TECHNICAL FIELD OF THE INVENTION AND PRIOR ART

The present invention relates to a converter station for connecting an AC system to a bipolar HVDC transmission line, said station comprising two converters each having a DC-side thereof connected on one hand to a respective of two poles of said transmission line on high potential and on the other to a neutral bus for that pole of a DC neutral arrangement in common to the converters on zero potential by being earthed, and having an AC-side connected to said AC system, said DC neutral arrangement having a member connecting to at least one electrode line and the arrangement being provided with first DC breakers enabling breaking of a first current path from the neutral bus of one pole to the neutral bus of the other pole at bipolar operation of the station for changing to monopolar operation thereof, the station also comprising a control device adapted to control a said changing from bipolar to monopolar operation by controlling a said first DC breaker to open said current path between said two neutral buses and establish a current path to said electrode line connecting member for diverting the current from said one pole thereto.

The invention is not restricted to any particular levels of voltage between earth and each said pole of the HVDC (High Voltage Direct Current) transmission line, but it is especially applicable to such voltages above 500 kV, which means that said transmission line transmits a substantial power and the transmission system to which the converter station belongs requires a very high level of reliability. Neither is the invention restricted to any particular levels of currents through said poles of a said transmission line, but said lines are preferably rated for currents above 1 kA.

The general design of a HVDC transmission system of this type is schematically shown in FIG. 1. It is shown how a converter station 1, 2 is arranged at each end of a HVDC transmission line 3 having two poles 4, 5, one with positive and one with negative polarity. An AC system 6, 6' is connected to each converter station through transformers 7, 7' for obtaining a suitable level of the voltage of the DC system. The AC system may be a generating system in the form of any type of power plant with generators of electricity or a consuming system or network connecting to consumers of electric power, such as industries and communities. Each converter station has two converters 8, 9 each having a DC side thereof connected on one hand to a respective of said two poles 4, 5 and on the other to a DC neutral arrangement 10 in common to the converters and connecting the low voltage side thereof to earth for defining a certain voltage on each pole. Each converter 8, 9 may be replaced by a set of converters, such as two or three, connected in series for obtaining a high voltage, such as 800 kV, on each pole. The converters include a number of current valves in any known configuration, for instance in a 12-pulse bridge configuration. The converters may be line commutated Current Source Converters in which the switching elements, such as thyristors, are turned off at zero crossing of the AC current in said AC system. The converters may also be forced commutated Voltage Source Converters, in which said switching elements are turn-off devices controlled according to a Pulse Width Modulation (PWM) pattern.

An advantage of a HVDC transmission system with respect to an AC transmission system is that remarkably lower losses result in the transmission line between the two converter stations at each end of these lines, whereas the converter stations are mostly more costly in a HVDC transmission system than in a AC transmission system. HVDC transmission systems are therefore mostly used to transmit much power, often in the order of some GW, over long distances, such as hundreds of kilometers. This means that the consequence for the connected AC systems can be very severe if both poles of the transmission line would be tripped, i.e. be disconnected as a consequence of for instance an earth fault, at the same time. If a said AC system belongs to a major system providing a large city with electric power such a bipolar trip may result in such a large reduction of the electric power supplied to said major system, that instabilities may be created in that system and other parts may then also fail. The consequence for the connecting AC system if only one pole is tripped is not half as severe as if both poles would be tripped. The present invention is occupied with the reliability of converter stations of the type defined in the introduction, which is closely related to the function of said DC neutral arrangement thereof, and a traditional DC neutral arrangement of a known converter station is shown in FIG. 2. This arrangement 10 has a neutral bus 11 connecting to the low voltage side of one converter 8 and a neutral bus 12 connecting to the low voltage side of the other converter 9. The neutral buses are connected to each other through a series connection of two first DC breakers 13, 14 and a disconnector 15, 16 associated with each DC breaker 13, 14. The midpoint 17 of this series connection between the first DC breaker and disconnector associated with one neutral bus and those associated with the other neutral bus is through a line 18 including disconnectors connected to a member 19 connecting to two electrode lines 20, 21 extending from the converter station to an electrode station 22, the function of which will be described further below. The DC neutral arrangement 10 also comprises a grounding switch 23 connected through lines including disconnectors to a point 24, 24' between the first DC breaker and the disconnector associated with each neutral bus 11, 12.

The function of a converter station having this known DC neutral arrangement shown in FIG. 2 is as follows. During bipolar operation of the converter station assumed to function as rectifier a current flows in the negative polarity pole 5 to the converter 9 and through the neutral bus 12 further to the neutral bus 11 having the first DC breakers 13, 14 and disconnectors 15, 16 closed therebetween. The current flows further through the converter 8 and to the other pole 4 with positive polarity of the HVDC transmission line according to the arrows 25. The disconnectors in the line 18 to the electrode line connecting member 19 are closed to define zero potential on the neutral.

We assume that an earth fault now occurs at the DC side for the pole 4, and FIG. 3 illustrates how the converter station and especially the DC neutral arrangement thereof will then act. The current valves of the converter 8 will then be blocked with by-pass pairs, which means that series connected current valves are fired and thereby the AC side is by-passed for protecting said AC system 6 and equipment connected thereto. These by-pass pairs will form a low impedance connection between the DC pole 4 and the DC neutral arrangement. It is shown by dots how the current will then flow to the earth fault 26. However, it is important to quickly isolate the earth fault 26 for maintaining the other pole 5 in operation. The disconnectors of the line 18 are closed for forming a current path to the electrode line connecting member 19 and through the electrode lines 20, 21 to the electrode station 22. The DC current of the pole 5 will now be shared by two current paths, one via the electrode lines to earth and one via the other pole 4 to the earth fault. About half the current will go in each of the two current paths. In order to isolate the earth fault the first DC breaker 13 is opened, so that all current will go through the electrode lines to the electrode station. When the DC breaker 13 is opened the disconnectors 15 and 15' at the neutral bus as well as a disconnector 27 at the pole 4 are opened to fulfil the isolation of the faulty pole 4.

If the DC breaker 13 fails to bring the current through it down to zero, i.e. commutate that current to the electrode lines, it will be reclosed. The grounding switch 23 is then closed as a backup for the DC breaker 13 while forming a low impedance connection between the neutral bus 12 and earth. Almost all current of the "healthy" pole 5 will then go down into the station earth grid, and the current through the other pole 4 will thereby go down to almost zero, so that the disconnectors 15, 27 may then be opened to fulfil the isolation. When the pole 4 is isolated the grounding switch 23 is opened and all current will be commutated to the electrode lines. The converter station and the HVDC transmission system is then in monopolar operation, so that half the power as in bipolar operation may still be delivered. As soon as possible, normally within about a minute a connection of the neutral bus 12 to the pole 4 will be obtained by closing disconnectors and a switch diverting the current according to the arrows 28 for metallic return instead of earth return through the electrode station if it would be necessary to maintain the monopolar operation of the system for not charging the earth of the electrode station too much.

The operation of the different components of the DC neutral arrangement will be correspondingly if an earth fault would instead occur at the other pole 5, so that then the breaker 14 and the disconnector 16 will be opened for conducting the current to the electrode station and so on.

The DC neutral arrangement of such a known converter station provides a quite good reliability but has still some drawbacks. It is not possible to separate the two electrode lines, which means that the entire electrode station connection will fail if an earth fault would appear in one of them, so that a detrimental bipolar trip of the system may then occur. It is neither possible to check the proper operation of each electrode line when not in use. Another drawback is that the grounding switch described above is the backup for each first DC breaker 13, 14, since this will during the time it is closed lift the potential of the earth grid due to the high current therethrough. The neutral point of the transformers of the converter station is connected to this earth grid, and this potential rise leads to a DC current through the transformers and thereby to a risk that also the other pole is tripped. Another disadvantage is that it is not possible to perform maintenance of the first DC breakers during bipolar operation of the converter station.

SUMMARY OF THE INVENTION

The object of the present invention is to provide a converter station of the type defined in the introduction, in which at least one of the drawbacks mentioned above of such a converter station already known is substantially reduced.

This object is according to the invention obtained by providing such a station in which the DC neutral arrangement has in said first current path at least two first DC breakers connected in series and adapted to act as a backup for each other would the other thereof fail to break said first current path upon a control of said control device to change from bipolar to monopolar operation. Such a change is done for isolating a faulty section of the transmission system.

This means that there will be no need to close any grounding switch would a said first DC breaker fail, since there is at least one further first DC breaker which may then be controlled to open would for instance an earth fault occur on any of said two poles.

According to another embodiment of the invention said DC neutral arrangement comprises at least two said first current paths each having at least two said first DC breakers connected in series for backup of each other, and each first current path is designed to allow a current to flow therethrough for bipolar operation of the station irrespectively of the state of said first DC breakers in any other said first current path. This results in a very reliable function of the converter station, since maintenance may be carried out of the first DC breakers of one first current path at the time without any power reduction even at bipolar operation of the HVDC transmission system to which the converter station belongs. It is then of course also possible to test the DC breakers of one said first current path at the time without disturbing the operation of the converter station. Thus, it may be ensured that the first DC breakers will all function properly when they are to carry out a breaking action, at the same time as each said breaker has another such breaker as backup so that the risk of being forced to use a grounding switch for changing from bipolar to monopolar operation would in fact be eliminated.

According to another embodiment of the invention said DC neutral arrangement is provided with two said electrode line connecting members for connecting to a separate said electrode line each and means for connecting each neutral bus to an optional of said two electrode line connecting members. This means that an earth fault on one of the electrode lines or equipment associated therewith may be isolated, so that current may still be led through the other electrode line to the electrode station and a bipolar trip may be avoided at monopolar operation of the converter station. The separation of the two electrode lines in this way also increases the possibilities to carry out maintenance of equipment connected to such an electrode line.

According to another embodiment of the invention constituting a further development of the embodiment last mentioned said connecting means comprises for each said neutral bus a series connection of three DC breakers shared by said neutral bus and a respective of said electrode line connecting members in a one and a half breaker system. Thus, the breakers are arranged in a similar way as for an AC switchyard. This way of connecting results in a high reliability of the operation of a DC neutral arrangement with a limited number of DC breakers. Furthermore, each DC breaker has advantageously a disconnector on each side thereof for isolating the DC breaker once it has been opened for diverting a current to the electrode station or simply for carrying out maintenance of the DC breaker.

According to another embodiment of the invention the converter station has in each said series connection of three DC breakers said neutral bus connecting to the series connection between two of the DC breakers on one side of a mid DC-breaker and said electrode line connecting member connecting to the series connection between two of the DC breakers on the other side of said mid DC breaker.

According to further embodiment of the invention said DC neutral arrangement comprises a first conducting bus to which each neutral bus is connected through one of said DC-breakers of said series connection of three DC breakers associated therewith. This means that a said first current path between the two neutral buses will be formed by one such DC breaker of said series connection of three DC breakers and said first conducting rail or line, and that these two DC breakers will act as backup for each other, so that these two DC breakers connecting the neutral buses to said rail or line are said first DC breakers connected in series in one said first current path.

According to another embodiment of the invention said DC neutral arrangement comprises a second conducting bus to which each said electrode line connecting member is connected through one of said DC breakers of said series connection of three DC breakers associated therewith. This means that the DC breaker connecting to said second conducting bus may be used to isolate an electrode line would an earth fault occur thereon or in any equipment associated therewith.

According to another embodiment of the invention said two mid DC breakers and the two DC breakers connecting the electrode lines to said second rail or line are said first DC breakers connected in series in one said first current path. Thus, this first current path includes four first DC breakers connected in series and providing backup for each other.

According to another embodiment of the invention said two conducting buses are interconnected through an additional line having a DC breaker and being in parallel with said two series connections of three DC breakers. The presence of this additional line further increases the possibilities of carrying out maintenance of equipment of the DC neutral arrangement without any power reduction.

According to another embodiment of the invention a grounding switch is connected to a point of said additional line for being closed and grounding this additional line would none of said DC breakers be able to break a current flowing from one neutral bus to the other when controlled to do so. This grounding switch will in the reality not be needed for this task, since the DC breakers act as backup for each other and may be subjected to checks and maintenance as often as desired, so that this grounding switch will mainly function as a backup for any said first DC breaker when maintenance is carried out of the other first DC breaker otherwise acting as backup therefor.

According to another embodiment of the invention said first rail or line is by a first disconnector connected to a midpoint of a line interconnecting said two poles of the HVDC transmission line, said first disconnector being adapted to be open at bipolar operation of the station, the line interconnecting said two poles is provided with a disconnector at both sides of said midpoint, and said control device is adapted to control said first disconnector to close and the disconnector connecting to one of the poles to close for metallic return of the current from the other pole at monopolar operation of the station after trip of said one pole. Metallic return of the current may in this way conveniently be obtained as soon as the faulty section is isolated, so that it may be avoided that the ground at the electrode station will be charged too much.

According to another embodiment of the invention the converter station is adapted for connecting an AC system to a bipolar HVDC transmission line adapted to have a voltage between each pole thereof and earth exceeding 200 kV, advantageously exceeding 500 kV, preferably being 600 kV-1500 kV, and most preferred being 600 kV-1000 kV. The converter station according to the invention is particularly advantageous for such high voltages, and it will be more interesting the higher this voltage and by that the power transmitted will be, since a bipolar trip of the HVDC transmission system would in such a case be very serious and a high reliability of the converter station is then of very great importance.

Further advantages as well as advantageous features of the invention will appear from the following description.

BRIEF DESCRIPTION OF THE DRAWINGS

With reference to the appended drawings below follows a specific description of a converter station according to an embodiment of the invention.

In the drawings.

DETAILED DESCRIPTION OF AN
EMBODIMENT OF THE INVENTION

Figure 4:
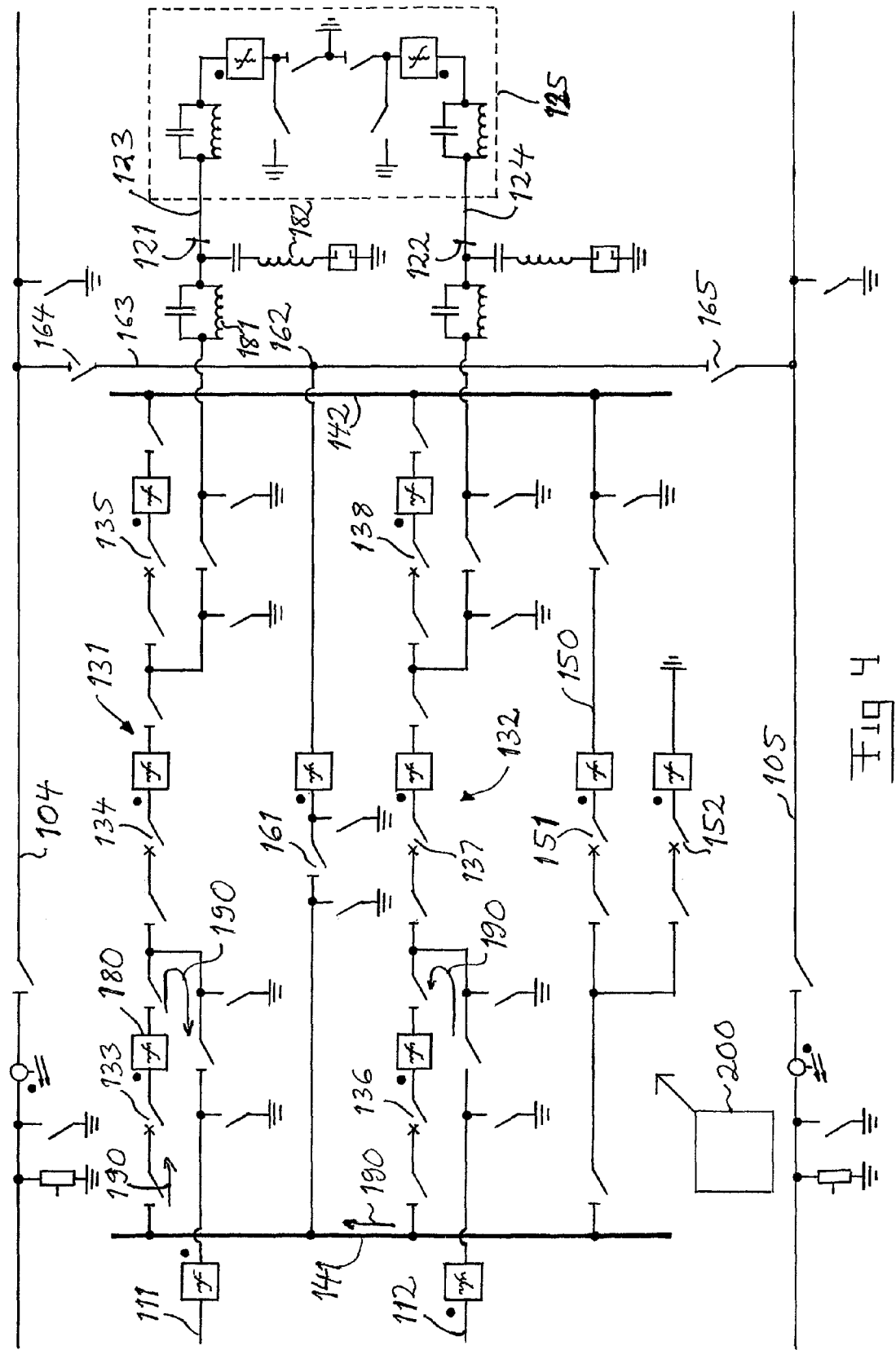
FIG. 4 is a view corresponding to FIG. 2 of the DC neutral arrangement in a converter station according to an embodiment of the present invention.

The neutral arrangement of a converter station according to an embodiment of the present invention with electrode station connected thereto and the two poles of a bipolar HVDC transmission line are shown in FIG. 4. The poles 104, 105 are here intended to have a polarity of +800 kV and −800 kV, respectively. This DC neutral arrangement is provided with two electrode line connecting members 121, 122 for connecting to a separate electrode line 123, 124 each connecting to a separate electrode circuit of an electrode station 125.

A series connection 131, 132 of three DC breakers 133-138 is provided for each neutral bus 111, 112 connecting the DC neutral arrangement to the low voltage side of a respective converter, and each such series connection is shared by the neutral bus and a respective of said electrode line connecting members 121, 122 in a one and a half breaker system. This is done by connecting each neutral bus 111, 112 to the series connection between two of the DC breakers 133, 134 and 136, 137, respectively, at one side of a mid DC breaker 134 and 137, respectively, and the electrode line connecting member 121 and 122, respectively, to the series connection between said mid DC breaker and the DC breaker 135 and 138, respectively, on the other side of the mid DC breaker. The DC neutral arrangement further comprises a first conducting bus 141 to which each neutral bus 111, 112 is connected through one of the DC breakers 133 and 136, respectively, of said series connection of three DC breakers. One first conducting path between the two neutral buses is by that formed through said two DC breakers 133, 136 and the bus 141 connecting them to each other.

The DC neutral arrangement also comprises a second conducting bus 142 to which each electrode line connecting member 121, 122 is connected through one DC breaker 135 and 138, respectively, of the series connection 131 and 132, respectively, of three DC breakers. The two conducting buses 141, 142 are also interconnected through an additional line 150 having a DC breaker 151 and being in parallel with said two series connections 131, 132 of three DC breakers. A grounding switch 152 is connected to a point of the additional line 150 for being closed and grounding this additional line.

Said first conducting rail or line 141 is by a first disconnector 161 connected to a midpoint 162 of a line 163 interconnecting the two poles 104, 105 of the HVDC transmission line. This first disconnector is adapted to be open at bipolar operation of the converter station. The line 163 interconnecting said two poles is provided with a disconnector 164, 165 on both sides of said midpoint 162. This arrangement is used for metallic return.

Finally, disconnectors are connected in series with each DC breaker on both sides thereof for making it possible to isolate the DC breaker for maintenance, but also for creating a physical interruption of a conducting path once the DC breaker has brought the current therethrough down to zero. It is also illustrated how a number of direct current measuring devices are arranged for supervising the function of different parts of the DC neutral arrangement, such as that indicated by 180. Trap filters 181 and injection circuits 182 for electrode line impedance supervision are also indicated in the figure.

The function of the DC neutral arrangement shown in FIG. 4 is as follows. All the DC breakers 133-138 and 151 are normally closed during bipolar operation of the station, which means that one first current path will be formed from the neutral bus 112 to the neutral bus 111 through the DC breaker 136, the conducting rail or line 141 and the DC breaker 133 as indicated by the arrows 190. Another said first current path is formed through the DC breakers 137 and 138, the second conducting rail or line 142 and the DC breakers 135 and 134. Furthermore, the current may also find a way through the DC breaker 136, the first conducting bus 141, the additional line 150 with DC breaker 151, the second conducting bus 142 and the DC breakers 135 and 134. This means that during bipolar operation of the HVDC transmission system to which the converter station belongs maintenance may be carried out of any of the DC breakers 133-138 and 151 without any power reduction. If for instance maintenance is to be carried out on the DC breaker 133 this is opened and the disconnectors on both sides thereof are opened, which means that the current may not flow between the neutral buses through the first current path indicated by the arrows 190, but it will still flow between the neutral buses through said other first current path going through the DC breakers 137, 138 and 134, 135. It is also possible to carry out maintenance on the equipment associated with one electrode line at the time, since the other electrode line with equipment associated therewith will still be ready to take care of transport of current to the electrode station upon trip of one of the poles and changing to monopolar operation.

Figure 1:
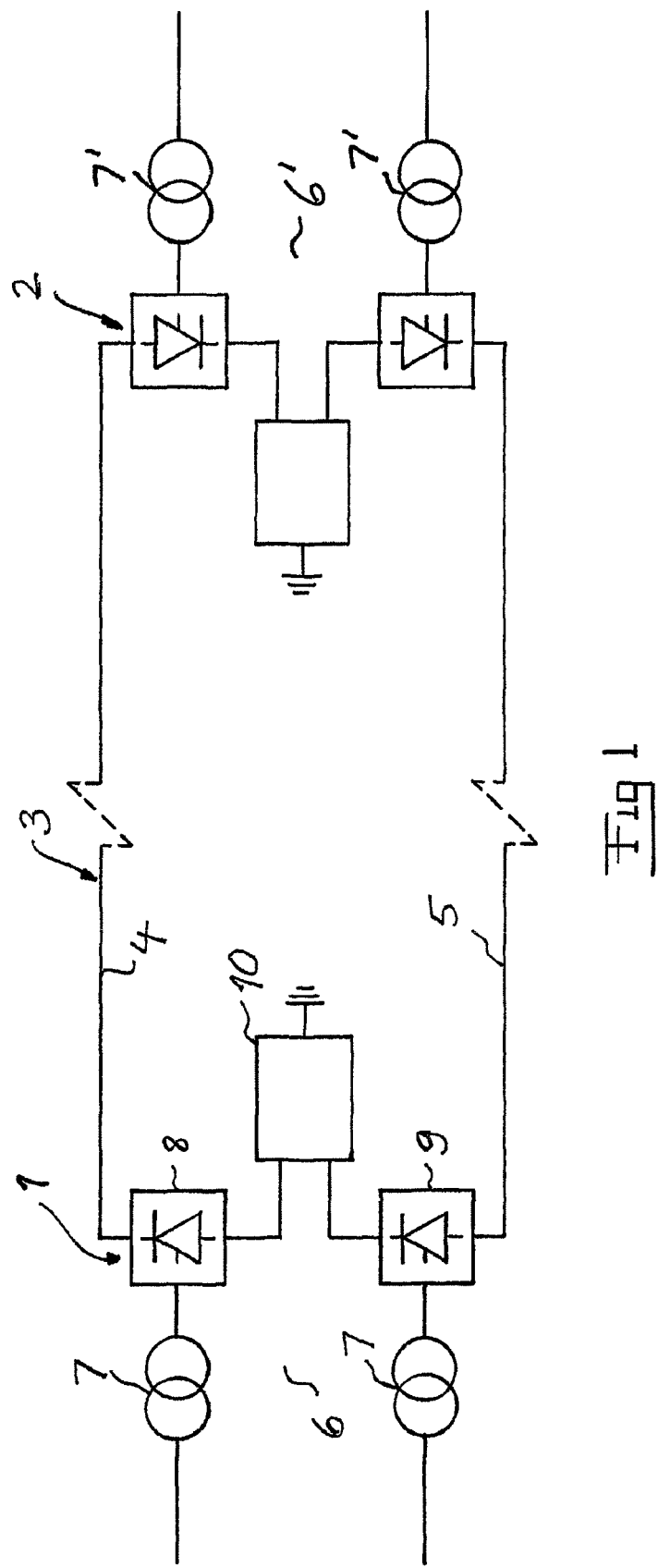
FIG. 1 is a very schematic view illustrating the general structure of a HVDC transmission system.
Figure 2:
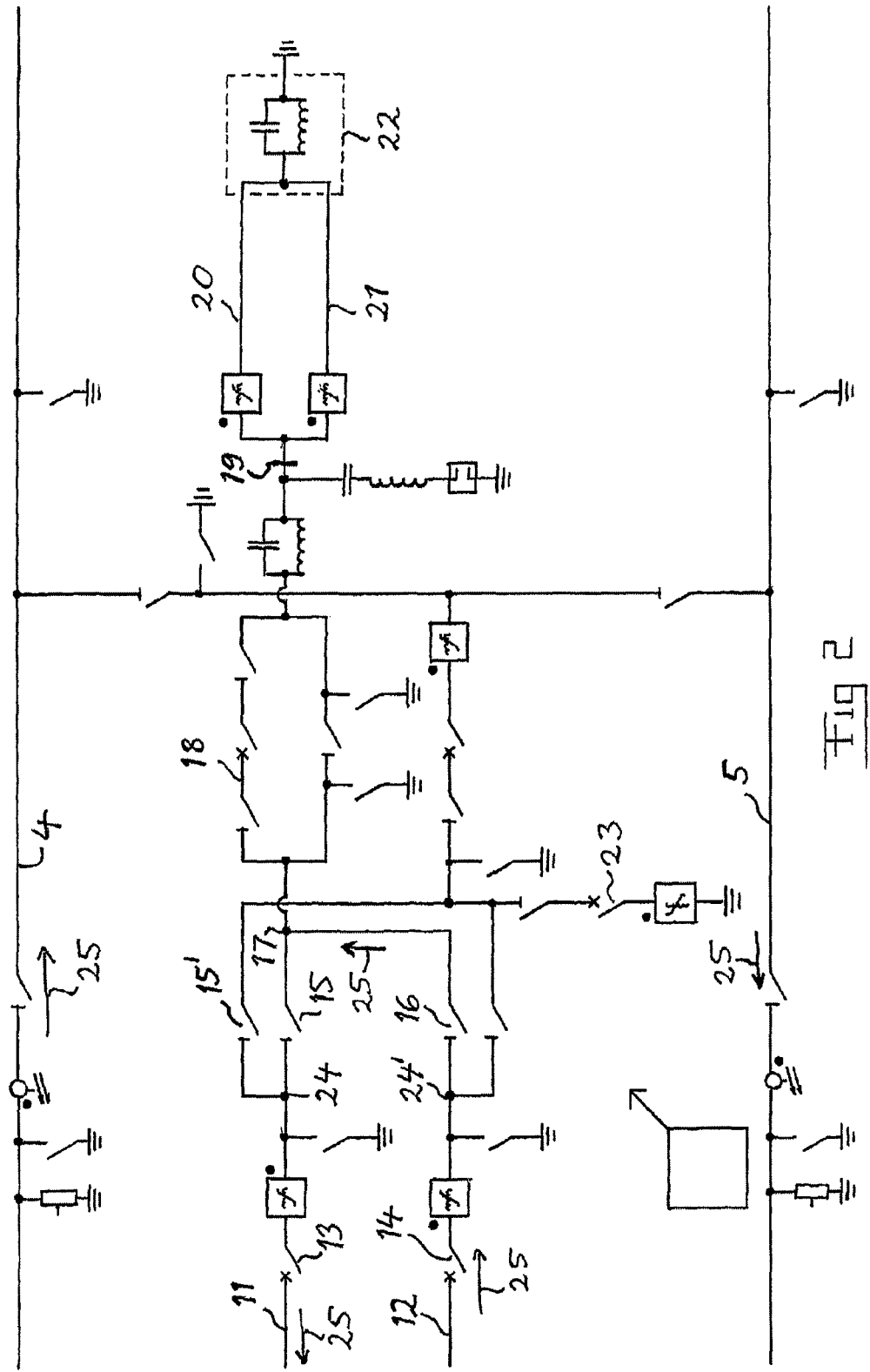
FIG. 2 is a schematic circuit diagram illustrating the structure of a DC neutral arrangement included in a known converter station of a HVDC transmission system.
Figure 3:
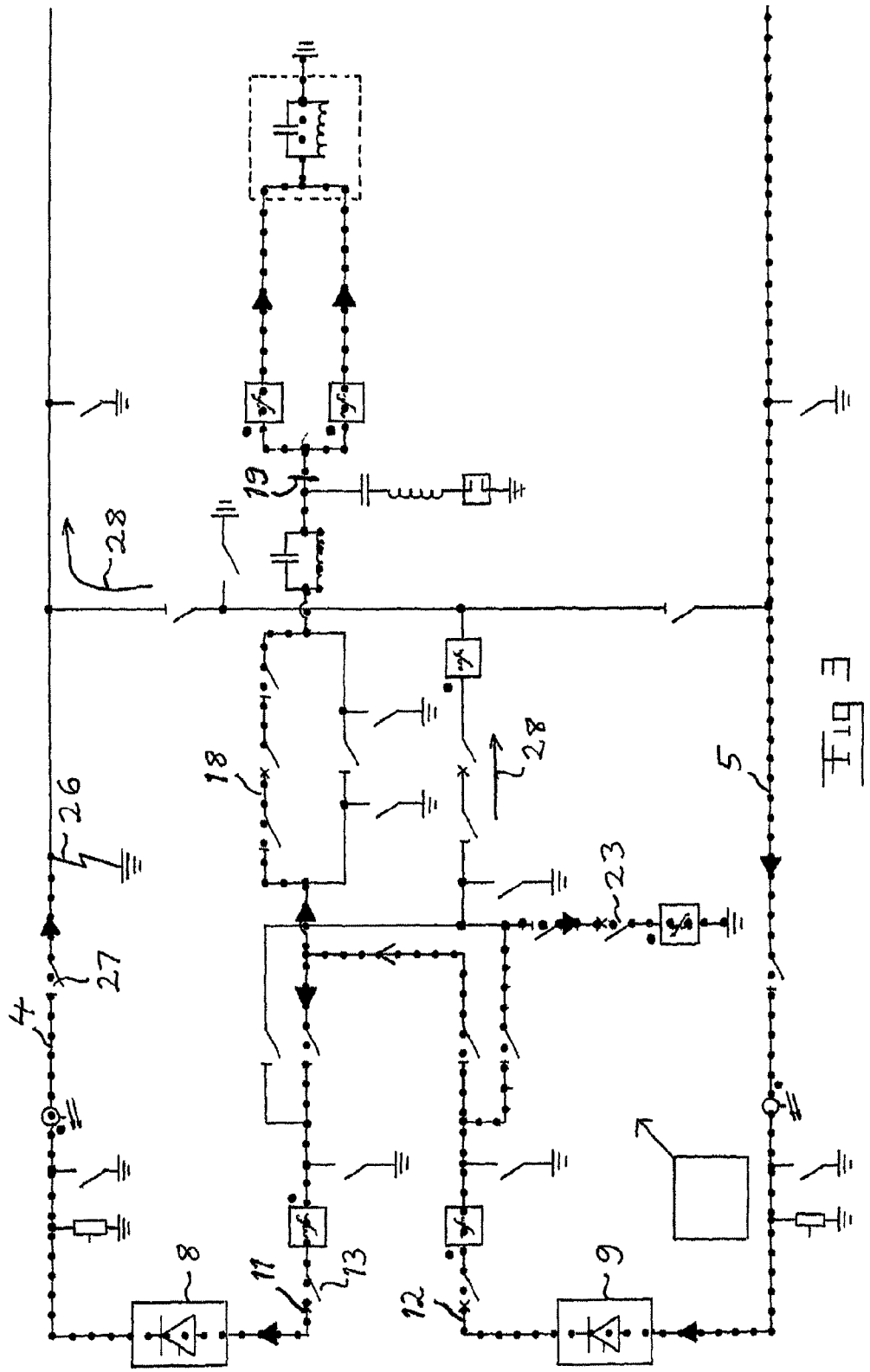
FIG. 3 is a view of the DC neutral arrangement according to FIG. 2 used for explaining the function thereof when an earth fault appear on one pole.

We do now assume that an earth fault occurs on the pole 104 as described with reference to FIG. 3. The control device 200 will then control the DC breakers 133 and 134 to open and by that break the current paths from the neutral bus 112 to the neutral bus 111. Disconnectors associated with these DC breakers will finalize the breaking action when the current has been brought down to zero. The current from the pole 105 arriving at the neutral bus 112 may then flow through the DC breaker 137 to the electrode line connecting member 122 and through the DC breakers 137, 138, the second conducting bus 142 and the DC breaker 135 to the electrode line connecting member 121. Would an earth fault result in one electrode line or equipment associated therewith this may be isolated. We assume that such an earth fault results in connection with the electrode line 123. The DC breaker 135 will then also be opened, so that the current from the neutral bus 112 may only arrive to the electrode line connecting member 122.

Would the DC breaker 133 fail to bring the current therethrough down to zero the DC breaker 136 may be controlled to open as a backup. Would the DC breaker 134 fail to bring the current therethrough down to zero the DC breaker 135 may be controlled to open as a backup. This means that the electrode line connecting member 121 is temporarily disconnected before a disconnector in connection with the DC breaker 134 may be opened.

The grounding switch 152 will in practice only be used as a backup for any DC breaker when maintenance is carried out on a DC breaker otherwise backing up the DC breaker first mentioned.

As soon as the conditions for monopolar operation have been stabilized the disconnector 161 and the disconnector 164 are closed and the connection between the neutral bus 112 and the electrode line connecting members is interrupted in both converter stations for metallic return of the current and avoiding to charge the ground at the electrode station too much would there still be a need of continued monopolar operation of the HVDC transmission system.

The function of the converter station, and especially the DC neutral arrangement thereof, will of course be in correspondence with the above description would a trip instead result of the other pole 105 of the transmission line. This would for instance mean that the DC breakers 136 and 137 will be controlled to open for bringing the current therethrough down to zero with the DC breakers 133 and 138 as backups.

The invention is of course not in any way restricted to the embodiment described above, but many possibilities to modifications thereof would be apparent to a person with ordinary skill in the art without departing from the basic idea of the invention as defined in the appended claims.

The invention claimed is:

1. A converter station for connecting an AC system to a bipolar HVDC transmission line, said station comprising:
    two converters each comprising a DC-side, each DC-side connected to a first pole of said transmission line, each DC-side also being connected to a first neutral bus of a DC neutral arrangement in common to the converters on zero potential by being grounded, and each converter having an AC-side connected to said AC system,
    said DC neutral arrangement comprising two electrode lines connecting members, each electrode line connecting member being connected to at least one of the electrode lines, the DC neutral arrangement further comprising first DC breakers that are closed during bipolar operation of the station so that at least two first current paths are formed from the first neutral bus of the first pole of the transmission line to a second neutral bus of a second pole of the transmission line, wherein said DC neutral arrangement further comprises two connectors, each connector being configured to connect each neutral bus to one of said two electrode line connecting members, and
    a control device adapted to control a change from bipolar to monopolar operation by controlling said first DC breakers to open said at least two first current paths between said first neutral bus and said second neutral bus and to establish a current path to said electrode line connecting members for diverting the current from said first pole and said second pole thereto,
    wherein each of said at least two first current paths has at least two of said first DC breakers connected in series for backup of each other, and wherein each of said at least two first current paths is designed to allow a current to flow therethrough for bipolar operation of the station irrespective of the state of said first DC breakers in any other said at least two first current paths.

2. The converter station according to claim 1, wherein said connector comprises, for each neutral bus, a series connection of three of said DC breakers shared by each neutral bus and a respective one of said electrode line connecting members in a one and a half breaker system, wherein each of said series of three DC breakers comprises one of said first DC breakers.

3. The converter station according to claim 2, wherein each said series connection of three DC breakers connects to a portion of the series connection between two of the three DC breakers on a first side of a middle of said three DC breakers, and wherein said respective one of said electrode line connecting members connects to the series connection between two of the three DC breakers on a second side of said middle of said three DC breakers.

4. The converter station according to claim 2, wherein said DC neutral arrangement further comprises a first conducting bus to which each neutral bus is connected through one of said DC breakers of said series connection of three DC breakers associated therewith.

5. The converter station according to claim 4, wherein the one of the DC breakers connecting the neutral buses to said conducting bus is said first DC breakers connected in series in one said first current path.

6. The converter station according to claim 4, wherein said DC neutral arrangement further comprises a second conducting bus to which each said electrode line connecting member is connected through one of said DC breakers of said series connection of three DC breakers associated therewith.

7. The converter station according to claim 3, wherein said first and second middle of said DC breakers and the two DC breakers on the first side and the second side of the first and second middle of said DC breakers connecting the electrode lines to said second bus are said first DC breakers connected in series in one said first current path.

8. The converter station according to claim 6, wherein said first and second conducting buses are interconnected through an additional line having an additional DC breaker and being in parallel with said series connections of three DC breakers.

9. The converter station according to claim 8, further comprising:
   a grounding switch connected to a point of said additional line for being closed and grounding the additional line if none of said first DC breakers were able to break a current flowing from one of said first and second neutral bus to another of said first and second neutral bus when controlled to do so.

10. The converter station according to claim 4, wherein said first conducting bus is connected by a first disconnector to a midpoint of a line interconnecting said two poles of the HVDC transmission line, said first disconnector being adapted to be open at bipolar operation of the station, wherein the line interconnecting said two poles is provided with a disconnector on both sides of said midpoint, and wherein said control device is adapted to control said first disconnector to close and a disconnector connecting to one of the poles to close for metallic return of the current from the other pole at monopolar operation of the station after trip of said one pole.

11. The converter station according to claim 1, wherein the converter station is adapted for connecting an AC system to a bipolar HVDC transmission line adapted to have a voltage between each pole thereof and earth exceeding 200 kV.

* * * * *